(No Model.)
P. A. COVINGTON.
COFFEE POT.
No. 333,282. Patented Dec. 29, 1885.
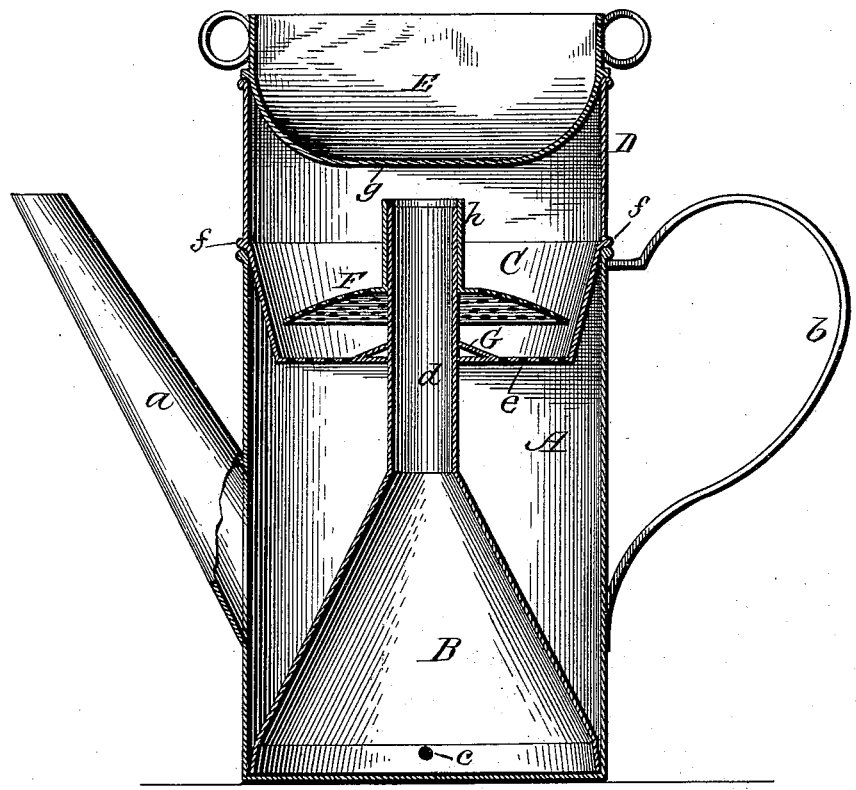
Witnesses
Inventor
Philip A. Covington.
By his Attorney
Chas. H. Fowler.

UNITED STATES PATENT OFFICE.

PHILIP A. COVINGTON, OF FORT WORTH, TEXAS, ASSIGNOR OF ONE-HALF TO ALBERT H. IVERSON, OF SAME PLACE.

COFFEE-POT.

SPECIFICATION forming part of Letters Patent No. 333,282, dated December 29, 1885.

Application filed June 30, 1885. Serial No. 170,284. (No model.)

*To all whom it may concern:*

Be it known that I, PHILIP A. COVINGTON, a citizen of the United States, residing at Fort Worth, in the county of Tarrant and State of Texas, have invented certain new and useful Improvements in Coffee-Pots; and I do hereby declare that the following is a full, clear, and exact description of the same, reference being had to the annexed drawing, making a part of this specification, and to the letters and figures of reference marked thereon.

The present invention has relation to that class of coffee-pots in which the body of the pot contains a cone-shaped chamber provided at the apex with a tube for the discharge of the boiling water as it passes through the same into a receptacle containing the coffee; and the object thereof is to improve the construction of this class of coffee-pots, which will be hereinafter described, and pointed out in the claims.

In the accompanying drawing, which represents a sectional elevation of my invention, A represents the body of the coffee-pot, provided with the usual spout, $a$, and handle $b$. On the bottom of the body A rests a conical chamber, B, of a diameter nearly equal to the interior diameter of the body, and has one or more perforations, $c$, for the boiling water to enter. The apex or smaller end of the conical chamber B has an upright tube, $d$, and to this tube is connected the cup C, for containing the ground coffee. This cup C is slightly tapering and has a wire-gauze or perforated bottom, $e$, and a circumferential shoulder or bead, $f$, which rests upon the upper rim of the body A to support the cup therein. Above the shoulder or bead $f$ is an extension, D, for supporting and containing a condensing-vessel, E, having a convex bottom, $g$, to present an increased condensing-surface to steam, the vessel containing cold water. Over the upper end of the tube $d$ fits a sleeve, $h$, which is attached to a concavo-convex perforated retaining-plate F, to keep the ground coffee from rising over the tube.

At the point where the bottom of cup C joins the tube $d$, I provide a flaring cap, G. to prevent the grounds of the coffee from settling and caking around the tube; also to conduct the water toward the rim of the cup, when it escapes through the tube onto the coffee-grounds and passes down through the same.

After the body A of the coffee-pot has been partially filled with water, the coffee placed in the cup C, and the retaining-plate F over the coffee, the vessel E is filled with cold water and set in position over the extension D of the cup. As the water boils it will circulate through the tube $d$ and discharge on the ground coffee contained in cup C, passing through it and through the bottom $e$ into the body A of the pot, where it again passes through the tube over, onto, and through the coffee in like manner, thus keeping up a continuous circulation of the boiling water through the finely-ground coffee. The steam which passes upward as it comes in contact with the bottom $g$ of vessel E is condensed and drops back upon the ground coffee, there not being a particle of steam escaping from the pot, and consequently all of the aroma of the coffee is retained.

The convexity of the bottom $g$, as well as the flaring cap G, are both valuable in performing their functions, the convexity of the bottom giving an increased condensing-surface to the steam, and consequently a more rapid and perfect condensation, and the flaring cap preventing the finely-ground coffee from settling and caking around the tube, and also guiding the water outwardly after it has worked through the grounds. The extension D to the cup C is also essential, as it enables the condensing-vessel to be supported some distance above the coffee contained in the cup, thus allowing more space for the steam to circulate and be condensed.

Having now fully described my invention, what I claim as new, and desire to secure by Letters Patent, is—

1. A coffee-pot provided with a cone-shaped chamber perforated at its base and at its apex provided with an upright tube, a cup having a perforated bottom and surrounding said tube, and a flaring cap connecting the tube and bottom, as shown, and a convex-concavo perforated retaining-plate having a sleeve to fit over the end of the tube, substantially as and for the purpose set forth.

2. A coffee-pot having a cone-shaped chamber perforated as shown, and provided with an upright tube, a perforated cup surrounding the same, a flaring cap connected to the tube and bottom of cup, a perforated retaining-plate, and a condensing-vessel formed with a convex bottom, said vessel resting upon the extension of the perforated cup, substantially as and for the purpose specified.

In testimony that I claim the above I have hereunto subscribed my name in the presence of two witnesses.

P. A. COVINGTON.

Witnesses:
R. HUGH NESBITT,
JAS. M. WILLIAMSON.